United States Patent
Hsiao et al.

(10) Patent No.: US 10,816,362 B2
(45) Date of Patent: Oct. 27, 2020

(54) LINEAR POSITION DETECTING DEVICE

(71) Applicant: Hiwin Mikrosystem Corp., Taichung (TW)

(72) Inventors: Heng-Sheng Hsiao, Taichung (TW); Zhi-Hao Xu, Taichung (TW)

(73) Assignee: HIWIN MIKROSYSTEM CORP., Taichung (TW)

( * ) Notice: Subject to any disclaimer, the term of this patent is extended or adjusted under 35 U.S.C. 154(b) by 65 days.

(21) Appl. No.: 16/198,180

(22) Filed: Nov. 21, 2018

(65) Prior Publication Data

US 2020/0158537 A1  May 21, 2020

(51) Int. Cl.
*G01D 5/14* (2006.01)
*G01D 5/16* (2006.01)

(52) U.S. Cl.
CPC .............. *G01D 5/145* (2013.01); *G01D 5/16* (2013.01)

(58) Field of Classification Search
CPC .................................. G01D 5/145; G01D 5/16
See application file for complete search history.

(56) References Cited

U.S. PATENT DOCUMENTS

| | | | | |
|---|---|---|---|---|
| 5,233,294 A | * | 8/1993 | Dreoni | G01B 7/003 324/207.16 |
| 7,215,112 B1 | * | 5/2007 | Recio | G01D 5/145 324/207.11 |
| 2016/0084676 A1 | * | 3/2016 | Moriyuki | G01D 5/2457 324/207.24 |

* cited by examiner

*Primary Examiner* — Clayton E. LaBalle
*Assistant Examiner* — Michael A Harrison
(74) *Attorney, Agent, or Firm* — Muncy, Geissler, Olds & Lowe, P.C.

(57) ABSTRACT

A linear position detecting device applied to a linear motion system for motion measurement is provided. The linear position detecting device comprises a coding element and a detecting element corresponding to the coding element for retrieving the signal of the coding element to provide the position information. The coding element comprises a base, a first coding unit and a second coding unit wherein the base comprises an axial direction parallel to a length of the base, and a radial direction perpendicular to the axial direction. The first coding unit is configured on the base and comprises a plurality of first tracks extended along the axial direction and alternately arranged along the radial direction. The second coding unit is configured on the base and adjacent to the first coding unit, and comprises a plurality of second tracks wherein the second tracks are extended along the radial direction and alternately arranged along the axial direction.

8 Claims, 5 Drawing Sheets

LINEAR POSITION DETECTING DEVICE

BACKGROUND OF THE INVENTION

Field of the Invention

The invention relates to a position detecting device, and more particularly to a linear position detecting device.

Description of the Related Art

The conventional position detecting device for the linear or annular direction provides a pair of the sensor and the permanent magnetic disposed on the toothed ferromagnetic body to measure the movement and provide the position information.

However, the toothed ferromagnetic body applied to both linearity and annularity comprises a plurality of tracks extended along the width direction and alternatively arranged along the length direction. In other words, the conventional position detecting device can only detect the movement in the width direction or the length direction of the toothed ferromagnetic body.

SUMMARY OF THE INVENTION

In view of the disadvantages of prior art, the object of the present invention is to provide a linear position detecting device with two coding units and an integrated analog sensor such that the shift error can be detected and fixed through a compensation method thereby reducing the defect loss.

To achieve the above object, the linear position detecting device comprises a coding element and a detecting element corresponding to the coding element for retrieving the signal of the coding element to provide the position information. The coding element comprises a base, a first coding unit and a second coding unit wherein the base comprises an axial direction parallel to a length of the base, and a radial direction perpendicular to the axial direction. The first coding unit is configured on the base and comprises a plurality of first tracks extended along the axial direction and alternately arranged along the radial direction. The second coding unit is configured on the base and adjacent to the first coding unit, and comprises a plurality of second tracks wherein the second tracks are extended along the radial direction and alternately arranged along the axial direction.

In one embodiment of the present invention, the base is made of the magnetic material or the magnetic permeable material.

In one embodiment of the present invention, the second coding unit is an incremental coding unit or an absolute coding unit.

In one embodiment of the present invention, the detecting element comprises a first detector and a second detector wherein the first detector senses the amplitude signal of the coding element and the second detector senses the magnetic field magnitude of the coding element.

In one embodiment of the present invention, the first detector is a magneto-resistive sensor and the second detector is a hall sensor.

In one embodiment of the present invention, the linear motion system comprises a fixture and a mover wherein the coding element is disposed on the fixture, and the detecting element is disposed on the mover with a gap.

In one embodiment of the present invention, the fixture is a linear guideway and the mover is a carrier.

Accordingly, the linear position detecting device comprises two coding units and an integrated analog sensor to detect the shift error and fix the shift error with a compensation method thereby reducing the defect loss.

DETAILED DESCRIPTION OF THE PREFERRED EMBODIMENTS

Figure 1:
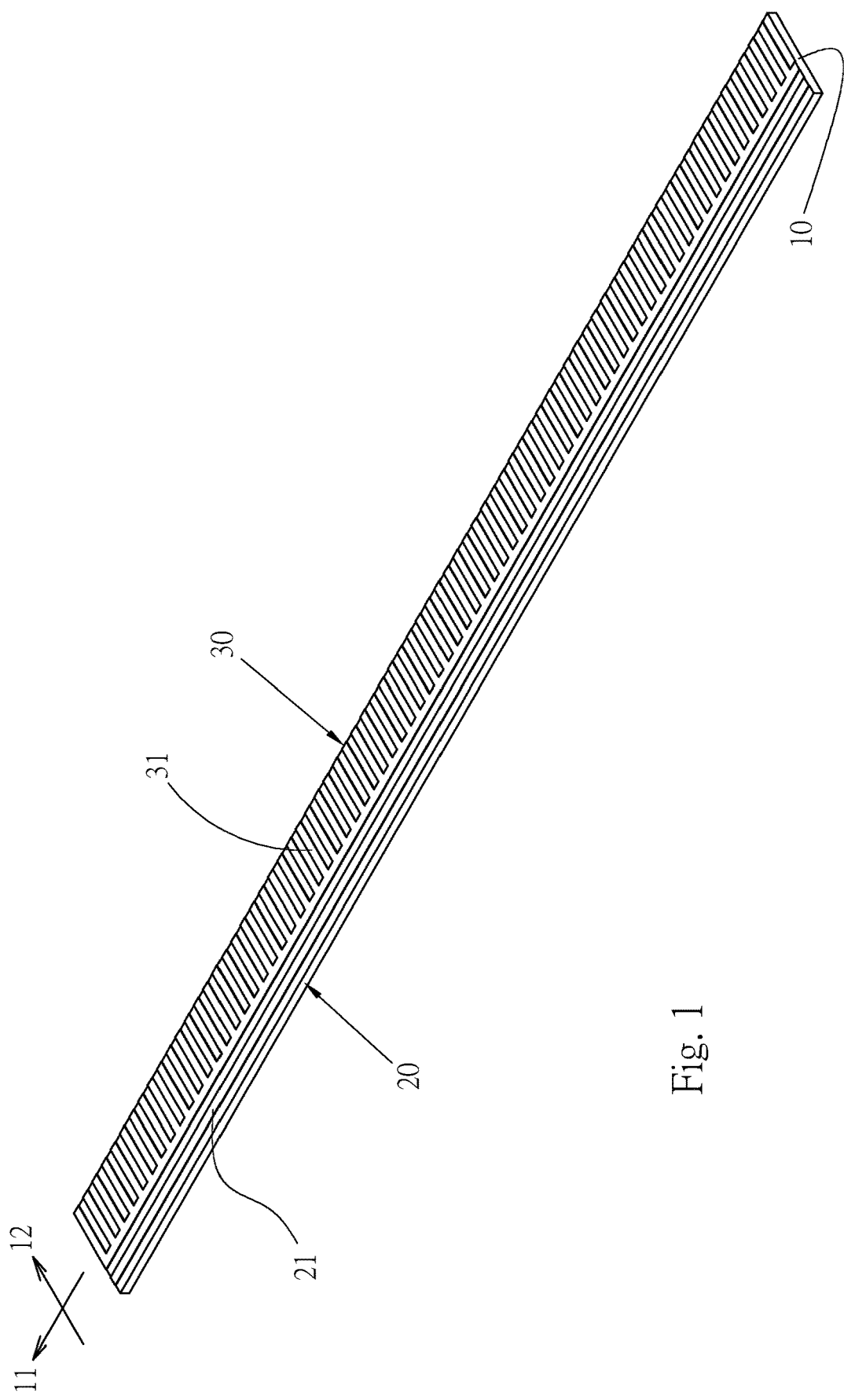
FIG. 1 is a schematic view of the coding element of the first embodiment of the present invention.

The linear position detecting device of the present invention comprises a coding element and a detecting element. The coding element shown in FIG. 1 comprises a base 10, a first coding unit 20 and a second coding unit 30 wherein the first coding unit 20 and the second coding unit 30 are adjacent with each other. The base 10 comprises an axial direction 11 parallel to a length of the base 10 and a radial direction 12 perpendicular to the axial direction 11. In this embodiment, the base 10 is provided in a linear formation and made of the magnetic material or the magnetic permeable material.

Figure 2:
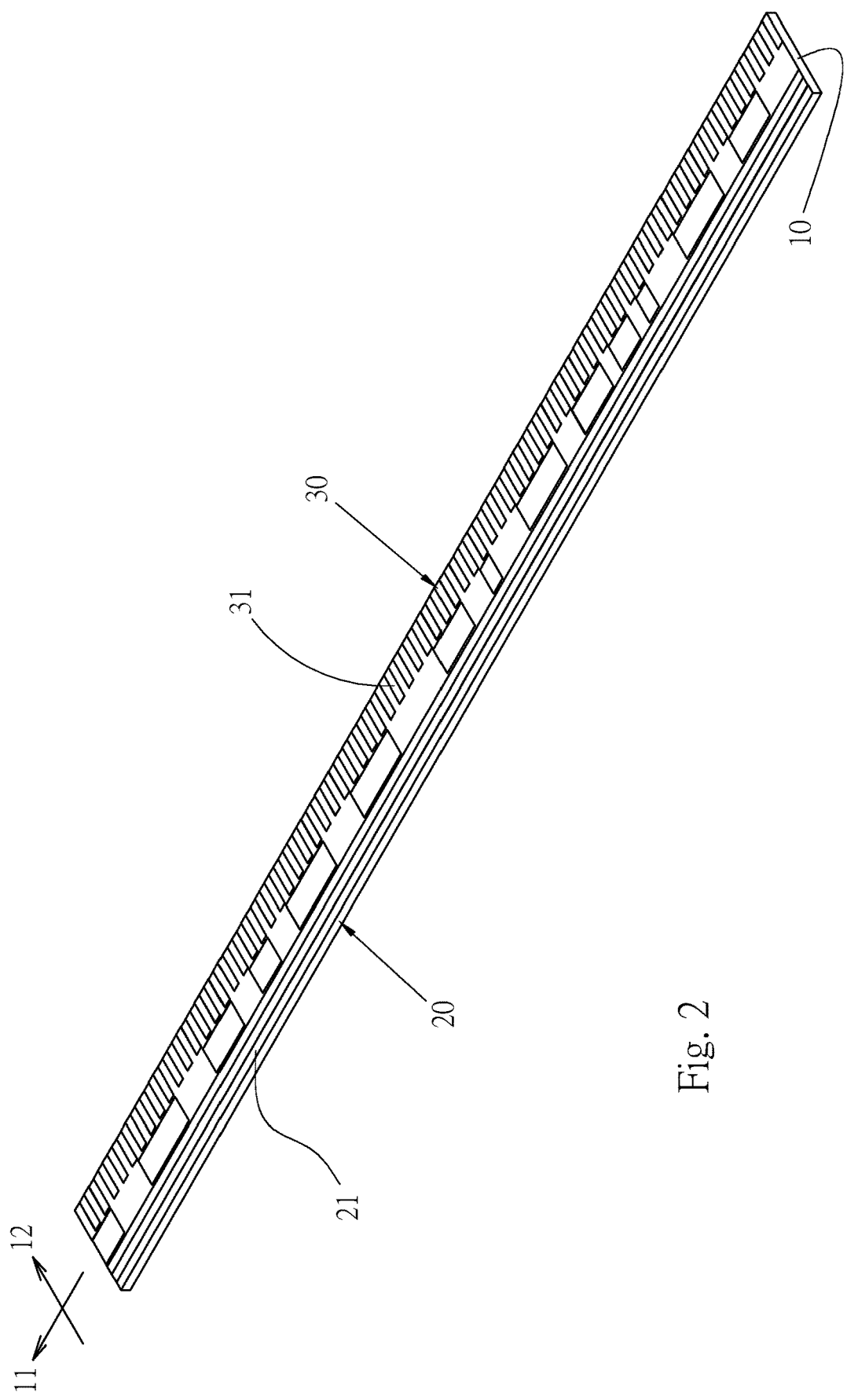
FIG. 2 is a schematic view of the coding element of the second embodiment of the present invention.

The first coding unit 20 comprises a plurality of first tracks 21 extended along the axial direction 11 and alternately arranged along the radial direction 12. The second coding unit 30 comprises a plurality of second tracks 31 extended along the radial direction 12 and alternately arranged along the axial direction 11. The second coding unit 30 can be an incremental coding unit in this embodiment or an absolute coding unit in the second embodiment shown in FIG. 2. The first coding unit 20 of the second embodiment is the same as that of the first embodiment so there is no more detailed description herein. In addition, the first coding unit 20 and the second coding unit 30 depend on the requirement of the precision to modify the number of the first tracks 21 and the second tracks 31.

Accordingly, the present invention provides the coding element with the first coding unit 20 and the second coding unit 30 respectively configured on the linear base 10 wherein the first tracks 21 and the second tracks 31 are arranged alternately along the axial direction 11 and the radial direction 12 respectively thereby measuring the error of the flatness, horizontal shift, vertical shift and other physical movement.

Figure 3:
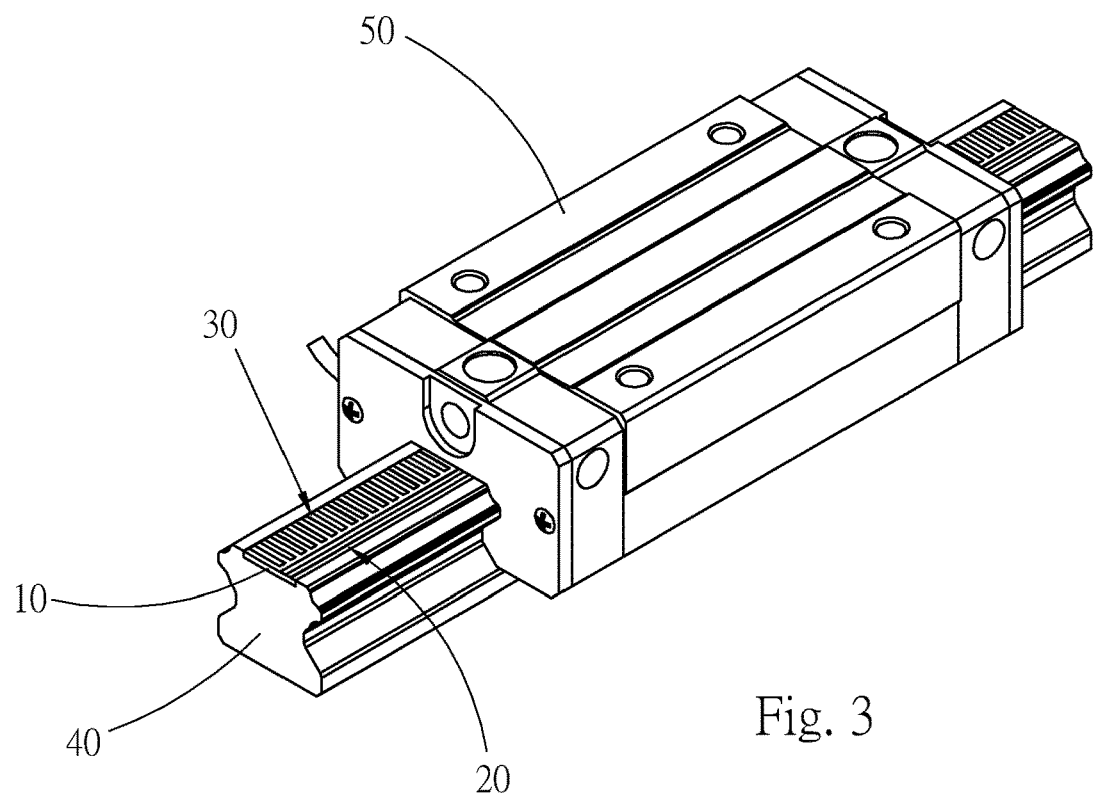
FIG. 3 is a schematic view of the linear position detecting device of the first embodiment of the present invention.
Figure 4:
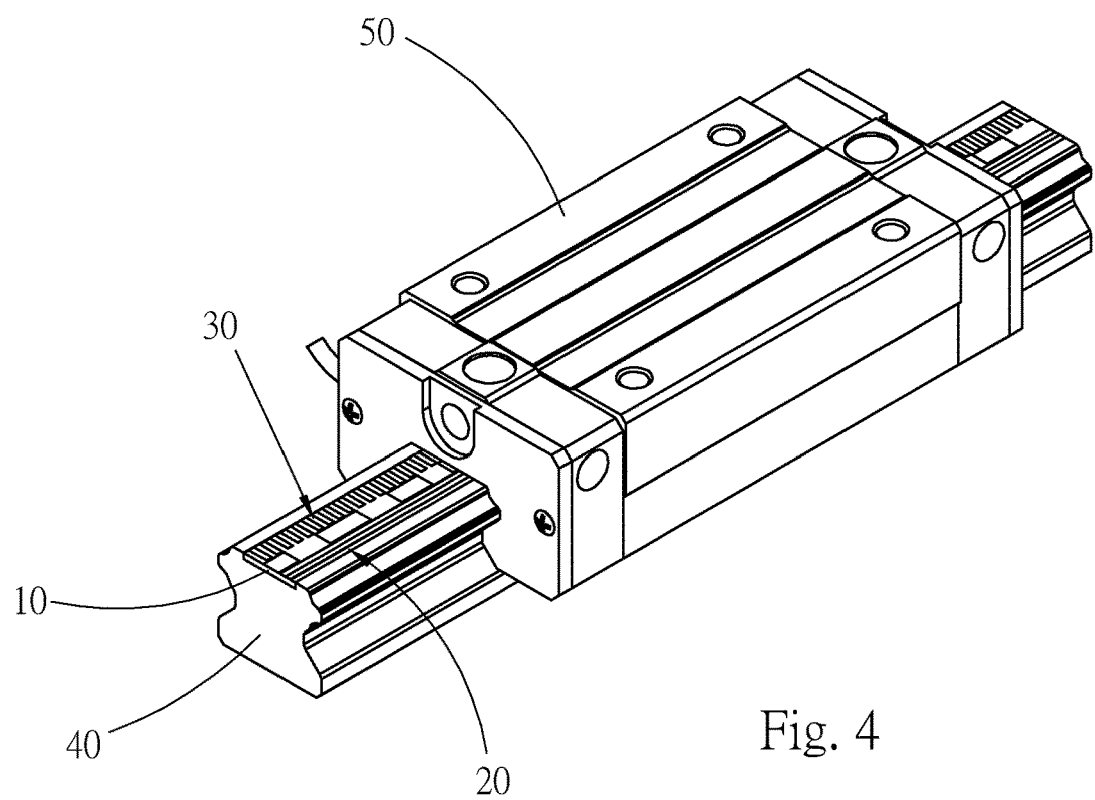
FIG. 4 is a schematic view of the linear position detecting device of the second embodiment of the present invention.

Refer to FIG. 3. The linear position detecting device of the present invention is applied to a linear motion system to measure the linear movement. In this embodiment, the linear motion system comprises a linear guideway 40 and a carrier 50 wherein the coding element is disposed on the linear guideway 40, and the detecting element is disposed on the carrier 50 and corresponds to the coding element with a gap for retrieving the signal of the coding element to provide position information. Specifically, the base 10 of the coding element is disposed on the surface of the linear guideway 40 wherein the axial direction 11 is coaxial with the linear guideway 40. The detecting element disposed on the carrier 50 comprises a first detector and a second detector wherein the first detector senses the amplitude signal of the coding unit and the second detector senses the magnetic signal of the coding unit. In this embodiment, the first detector is a magneto-resistive sensor and the second detector is a hall sensor. The second coding unit 30 can be an incremental coding unit in this embodiment or an absolute coding unit in the second embodiment shown in FIG. 4. The first coding unit 20 of the second embodiment is the same as that of the first embodiment so there is no more detailed description herein.

Figure 5:
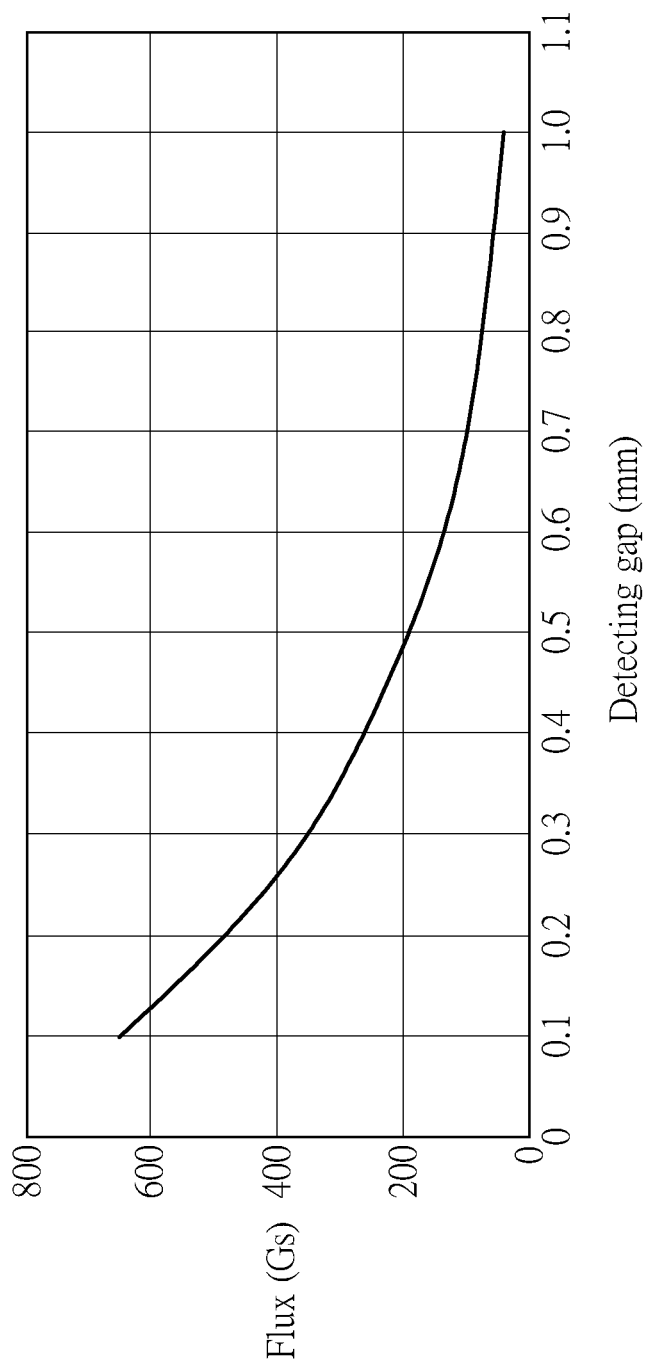
FIG. 5 is a chart illustrating the variation of the gap distance and the magnetic field magnitude between the coding element and the detecting element.

With respect to the signal retrieving of the detecting element, the first detector senses the incremental code or the absolute code to determine the position, and the second detector senses the magnetic field magnitude to determine the error of the flatness or the vertical shift. In detail, the detecting element is disposed on the carrier 50 and corresponds to the coding element with a gap such that the magnetic field magnitude is varied according to the distance of the gap (shown in FIG. 5) to determine the error of the flatness or the vertical shift.

Figure 6:
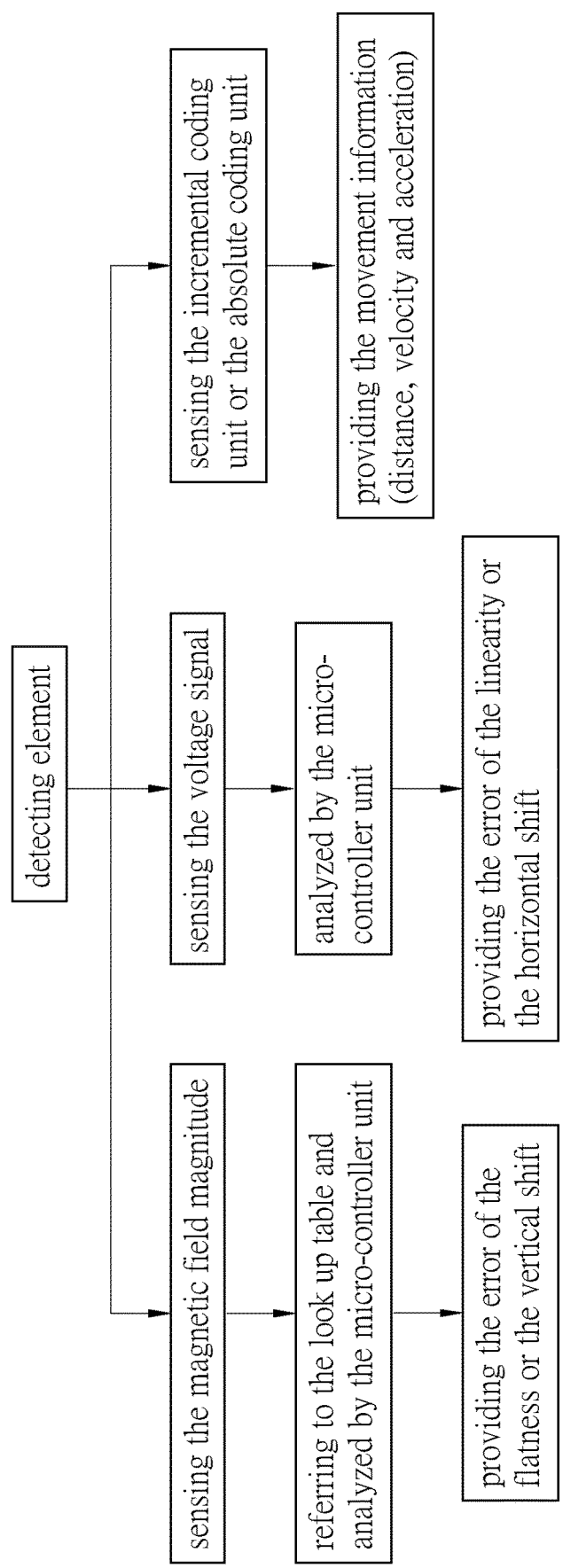
FIG. 6 is a flow chart illustrating the determination of the physical movement along different directions of the present invention.

Refer to the flow chart shown in FIG. 6 which illustrates the determination of the error of the flatness, horizontal shift, vertical shift, physical movement and the velocity. When the carrier 50 moves on the linear guideway 40, the detecting element provides a magnetic field magnitude by sensing the first coding unit 20 and referring to the look up table whereby the retrieved signal is analyzed by the micro-controller unit to provide position information, such as the error of the flatness or the vertical shift. In addition, the detecting element also provides a voltage signal by sensing the first coding unit 20 whereby the retrieved signal is analyzed by the micro-controller unit to provide position information, such as the error of the linearity or the horizontal shift. Also, the detecting element provides the movement information (distance, velocity and acceleration) by sensing the second coding unit 30 wherein the second coding unit 30 can be an incremental coding unit shown in FIG. 1 or an absolute coding unit in the second embodiment shown in FIG. 2.

As described above, the linear position detecting device applied to a linear motion system of the present invention not only provides the position information, but also provides the information of the physical movement along the axial direction 11 and the radial direction 12 through another coding unit and the corresponding analog detector, such as a hall sensor.

Consequently, the user can discover the shift error during the movement of the carrier immediately to fix the shift error with a compensation method thereby reducing the defect loss.

It is to be understood that the above descriptions are merely the preferable embodiment of the present invention and are not intended to limit the scope of the present invention. Equivalent changes and modifications made in the spirit of the present invention are regarded as falling within the scope of the present invention.

What is claimed is:

1. A linear position detecting device, applied to a linear motion system for motion measurement and comprising:
   a coding element, comprising:
      a base, comprising an axial direction parallel to a length of the base, and a radial direction perpendicular to the axial direction;
      a first coding unit, configured on the base and comprising a plurality of first tracks wherein the first tracks are extended along the axial direction and alternately arranged along the radial direction; and
      a second coding unit, configured on the base and adjacent to the first coding unit and comprising a plurality of second tracks wherein the second tracks are extended along the radial direction and alternately arranged along the axial direction; and
   a detecting element, corresponding to the coding element for retrieving the signal of the coding element to provide the position information,
   wherein the detecting element comprises a first detector and a second detector; the first detector senses the amplitude signal of the coding element and the second detector senses the magnetic field magnitude of the coding element.

2. The linear position detecting device as claimed in claim 1, wherein the base is made of the magnetic material.

3. The linear position detecting device as claimed in claim 1, wherein the second coding unit is an incremental coding unit.

4. The linear position detecting device as claimed in claim 1, wherein the second coding unit is an absolute coding unit.

5. The linear position detecting device as claimed in claim 1, wherein the first detector is a magneto-resistive sensor and the second detector is a hall sensor.

6. The linear position detecting device as claimed in claim 1, wherein the linear motion system comprises a fixture and a mover; the coding element is disposed on the fixture, and the detecting element is disposed on the mover.

7. The linear position detecting device as claimed in claim 6, wherein the fixture is a linear guideway and the mover is a carrier.

8. The linear position detecting device as claimed in claim 6, further comprising a gap between the detecting element and the coding element.

* * * * *